March 21, 1950     C. E. SMITH     2,501,478

CONTROL APPARATUS

Filed April 10, 1943

Inventor
CLYDE E. SMITH

By Francis J. Kleinpay
Attorney

Patented Mar. 21, 1950

2,501,478

UNITED STATES PATENT OFFICE 2,501,478

CONTROL APPARATUS

Clyde E. Smith, Port Homer, Ohio, assignor to
The Taylor-Winfield Corporation, Warren,
Ohio, a corporation of Ohio Application April 10, 1943, Serial No. 482,629

4 Claims. (Cl. 175—320)

1

This invention relates to the control of energizing circuits for electromagnetically actuated devices and more particularly to the synchronization and time delay of such energization with respect to the occurrence of a reference condition. The principles of the invention are particularly applicable to electric welding systems or the like, in which a heavy current impulse of short or controlled duration is supplied to the load and in which it is desired to effect a sequential control upon the initiation of or during the flow of welding current. Thus, certain welding methods and apparatus utilize different welding pressures during the welding cycle and ordinarily the change in pressure is effected during the flow of welding current. If the particular work at hand or the nature of the predetermined welding cycle is such that pressure change is to occur near the start of the flow of welding current it is obvious that the nature of the control apparatus employed must be capable, if the control is to be effective, of effecting the pressure change at an accurately timed interval after the initiation of the flow of welding current as measured in milliseconds of time. In co-pending application Serial No. 482,630, filed April 10, 1943, by M. M. A. Seeloff and C. E. Smith, now U. S. Patent No. 2,363,753, there is disclosed and claimed control arrangements whereby the general objects are accomplished primarily by energizing an electromagnetically actuated device by the discharge of a capacitor. The object of the present invention is to provide a simplified control system for a circuit for energizing an electromagnetically actuated device wherein the energization may be accomplished with pulsating half-wave or alternating current.

According to the present invention the control of the time of the effecting of the sequential condition is highly accurate within milliseconds of time particularly if the condition is to follow closely, i. e., within the time interval represented by the major part of a pulsation or half-wave of the energizing current, the appearance of the reference condition which, in welding apparatus, may be the initiation of the flow of welding current. If the interval of delay is to be greater than the time represented by said pulsation or half-wave the timing may be effected in increments of one cycle each and while this mode of operation limits the fineness of adjustment over the range of operation this characteristic is usually not objectionable since the factors making a long delayed interval desirable do not respond to precision of control in this longer range. Another object of the invention therefore is the provision of a simplified and reliable circuit timing the energization of an electromagnetically actuated device from a pulsating or alternating current source in which a wide range of adjustment may be effected but in which, nevertheless, precision in timing may be effected as required in the case of the actuation of the device following very closely the appearance of the reference condition. In welding thin stock, for example, and utilizing either the discharge of a capacitor or but a portion of the cycle of alternating current to effect the weld, if it is desired to effect a change in the welding pressure exerted during the flow of welding current the energization of the means effecting such change must be accomplished in milliseconds from the initiation of the flow of welding current. The present invention provides the practical apparatus for accomplishing this desired mode of operation.

A further and more specific object of the invention is the provision of an improved apparatus for controlling the operation of electric resistance welding systems having means to vary the pressure exerted by the electrodes during the welding cycle.

The above and other specific objects and advantages of the invention will become apparent upon consideration of the following detailed specification and the accompanying drawing wherein certain specific embodiments of a possible application of the principles of the invention are specifically disclosed.

Figure 1:
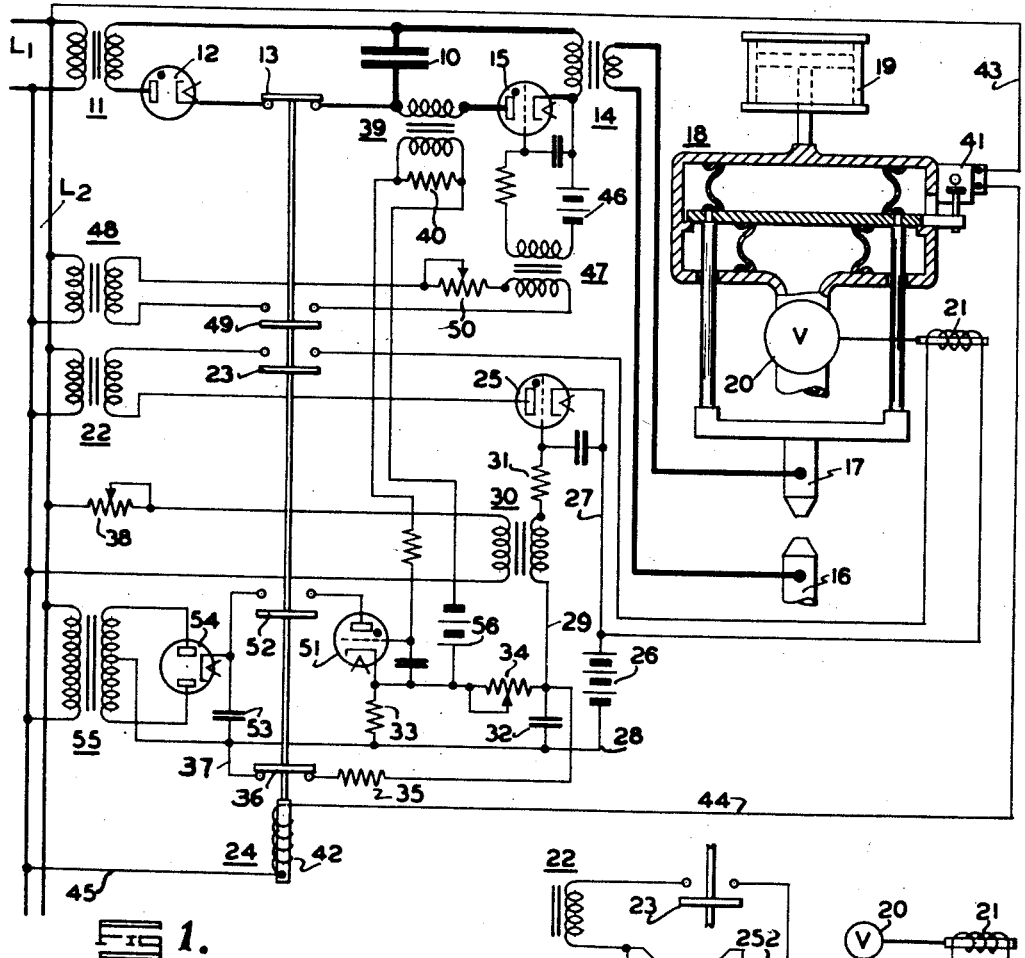
Figure 1 is a schematic diagram of a dual pressure electric resistance welding system utilizing the principles of the invention.

In the drawing the invention is shown, by way of illustration, as being applied to an electric welding system of the capacitor discharge type and to this end a principal or power capacitor 10 is provided and is arranged to be charged from a commercial line L1 through a charging transformer 11 and a rectifier 12. In certain systems of this nature a switch 13 is positioned intermediate the rectifier and capacitor to interrupt the charging circuit during discharge of the capacitor through the welding load. Normally a welding transformer 14 is employed and suitable means a², for example, a contactor, not shown or an electronic discharge device 15 is provided to control the discharge of the capacitor through the primary of the welding transformer. The secondary of the welding transformer is connected directly to the welding electrodes 16 and 17, one of which is movably supported whereby welding pressure may be applied therethrough.

The invention is specifically illustrated as being employed for the purpose of increasing the welding pressure applied by the electrodes a predetermined interval after the initiation of the flow of welding current. To effect such operation a pressure applying and changing device 18 is positioned intermediate the movable electrode 17 and the primary electrode moving and pressure applying means which may conveniently be a fluid pressure operated cylinder 19 having a fixed or a readily variable length of stroke. The device 18 is disclosed in detail in the above mentioned co-pending application and as stated therein is equipped with a valve 20 which upon actuation exhausts the fluid pressure in the lower bellows to correspondingly increase the pressure exerted by the electrodes. Valve 20 is arranged to be opened by a solenoid 21 the energizing circuit of which will now be described.

Branching from line L1 is a control energy source line L2 and deriving energy from this latter line is a transformer 22 the secondary of which is adapted to be connected to the solenoid 21 through the contactor 23 of a relay 24 and through the electronic discharge device 25. The resistance and inductance of the solenoid 21 may have such absolute and related values that the armature of the solenoid may be moved from fully retracted position to fully actuated position during but a portion of the time of current flow in one half cycle of the alternating current source in order that the valve will be opened and held open for a length of time sufficient to exhaust the small volume of the lower bellows during the half cycle interval.

The discharge device 25 is preferably of the gas-filled grid-controlled type which is normally biased beyond cut-off by a direct current potential source 26, the positive terminal of which is connected to the cathode of device 25 by means of conductor 27 while the negative terminal is connected to the grid through conductor 28, conductor 29, the secondary of an impulsing transformer 30 and the grid resistor 31. Interposed between conductors 28 and 29 is a timing capacitor 32 the function and operation of which will be explained below. Providing a direct current path around this capacitor is a resistance 33 and a potentiometer 34 in series. Another possible bypass is the resistance 35, the normally closed contactor 36 of the relay 24 and the conductor 37. The primary of transformer 30 is connected to a line L2 through the variable resistance 38 the function of which is to phase the impulse furnished by the secondary of transformer 30 at a lagging angle of but a few degrees as will be understood.

Timing capacitor 32 is normally maintained in completely discharged condition by the parallel circuit consisting of resistor 35, normally closed contactor 36, and conductor 37 and is arranged to be charged at a predetermined rate commencing with the appearance of a reference condition which in the present case may be the initiation of the flow of welding current through the primary of the welding transformer. To sense such initiation a transformer 39 of the current type is employed, the primary of which is inserted directly in the current path between the capacitor 10 and the primary transformer 14. A resistance 40 is connected across the secondary of the transformer 39 to develop a substantial voltage from the current induced in the secondary. In the system illustrated a welding cycle is initiated by admitting fluid pressure to the cylinder 19 and as the housing of the device 18 moves downwardly to move the common wall of the two bellows of the device 18 into free or floating position a switch 41 on the device 18 closes. Closure of switch 41 energizes the operating coil 42 of the relay 24 from line L1 through conductors 43, 44 and 45. The discharge device 15 is grid controlled and is normally biased beyond cut-off by direct current potential source 46 interposed between the cathode and grid. Included in series in this grid biasing circuit is the secondary of an impulsing transformer 47 the primary of which is connected to the secondary of a transformer 48 through the normally open contactor 49 of the relay 24 and the variable resistor 50. The primary of transformer 48 is connected to the line L2 and it will be apparent that the voltage applied to the transformer 47 will be generally in phase with the anode-cathode voltage of the tube 25. Transformer 47 is so phased that the voltage impulse furnished by it in opposition to the source 46 tends generally to initiate conduction in tube 15 simultaneously with initiation of conduction in tube 25. However, by adjustment of the resistor 50 the voltage impulse effected by transformer 47 may be made to occur at the natural power angle of the solenoid 21. Thus precise synchronization of the actuation of the control element (valve 20) with respect to the appearance of the reference condition (initiation of conduction in valve 15) may be effected.

Capacitor 32 provides a timing means for delaying the energization of the solenoid 21 a predetermined number of cycles after the initiation of conduction in valve 15 if such delay is desired. For reasons to be hereinafter pointed out if energization of solenoid 21 is to be delayed beyond the particular half cycle utilized to initiate conduction in valve 15 the timing or adjustment will normally be in one cycle steps. It will be observed that the capacitor 32 as well as being in the grid biasing circuit for the tube 25 is also in a series circuit including potentiometer 34, an electronic discharge device 51, preferably of the gas-filled grid-controlled type, normally open contactor of the relay 24, and capacitor 53. The latter may conveniently be maintained in charged condition by a full wave rectifier 54 deriving energy from the line L2 through transformer 55. Shunting potentiometer 34 and capacitor 32 is a resistor 33 and it will be apparent that upon the closing of contactor 52 and conduction in tube 51 capacitor 32 will be charged to the voltage developed across resistor 33 at a rate determined by the setting of the potentiometer 34. As explained above, relay 24 is energized and contactor 52 is therefore closed during the welding cycle. Device 51 is normally biased to cut-off by a direct current potential source 56 connected between the cathode of the device and one terminal of the resistance 40 associated with the secondary of the transformer 39, the other terminal being connected to the grid through the usual grid resistor as shown. Thus upon initiation of the discharge of the capacitor 10 tube 51 will be rendered conductive, it being understood that the transformer 39 is so phased that the voltage impulse developed across the resistance 46 is in opposition to the potential of the source 56.

Figure 2:
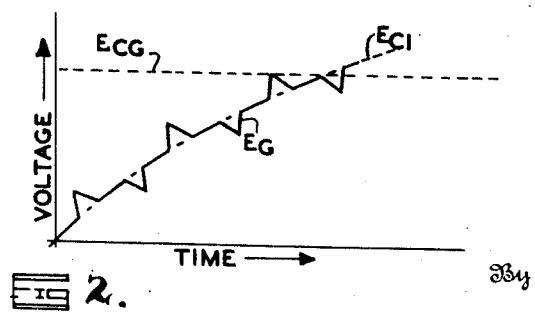
Figure 2 is a curve depicting an electrical characteristic of the control system of Figure 1.

The effect of the rise in potential across the capacitor 32 which is in series with the grid biasing circuit for the tube 25 is illustrated in Figure 2. The smooth dotted curve $E_{c1}$ represents the charge across the capacitor 32 while the jagged solid line $E_g$ represents the applied grid potential, the sharp projections from the smooth curve being caused by the impulses furnished by the transformer 30. The line $E_{cg}$ represents the critical grid biasing potential of the tube 25. It will be apparent that conduction in tube 25 will be initiated only during positive pulses from transformer 30 which pulses are one cycle apart. However, due to the adjustment of the resistor 38 as explained above, these pulses always occur at the beginning of each positive half cycle so that substantially all the energy contained in the half cycle is made available for the actuation of the parts moved by the solenoid 21 and for the holding of the parts in actuated positions an appreciable interval of time. If it is desired to pass alternating current into the solenoid the arrangement of Figure 3 may be employed.

Figure 3:
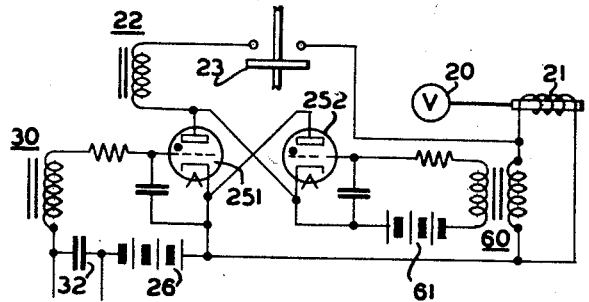
Figure 3 is a fragmentary schematic diagram of a modification of the control circuit of Figure 1.

In the modification of Figure 3 the single discharge device 25 is replaced by a pair of similar devices 251 and 252 connected in inverse parallel, the tube 251 being controlled in the same manner as the tube 25 in Figure 1. A "follow up," transformer 60 is connected across the solenoid 21 to furnish a grid potential to tube 252 in opposition to the normal negative biasing potential furnished by a source 61 to cause conduction in tube 252 following conduction in tube 251. In the modification of Figure 3 as in the system of Figure 1 the energizing circuit for the solenoid is established at the start of a positive half cycle.

In the system of Figure 1 if the inertia constants of the movable parts of the valve 20 and solenoid 21 are such that the valve will not move appreciably in a closing direction during the intervening negative half cycles of the energy source the quantity of energy contained in that portion of each or any positive half cycle furnished the solenoid need only be sufficient to effect full opening of the valve since the tube 25 will continue to conduct in each succeeding positive half cycle due to the maintenance of voltage on capacitor 32. Upon termination of the welding cycle and the retraction of the piston in cylinder 19 the switch 41 will be opened and the relay 24 de-energized. At this time contactor 13 reestablishes the charging of capacitor 10, contactor 49 enables the bias 46 to retake control of tube 15, contactor 23 interrupts the solenoid energizing circuit, contactor 52 breaks the cathode-anode circuit of tube 51 allowing grid bias 56 to regain control, and contactor 36 discharges capacitor 32. The parts are thus restored to their initial conditions preparatory to the carrying out of the next succeeding welding cycle.

If it is desired to effect actuation of valve 20 within a very short time interval of the initiation of flow of welding current, i. e. within a half cycle of the alternating current source, the potential of source 26 is reduced to enable the first positive pulse from transformer 30 to initiate conduction in tube 25. At a later time—as the current builds up in the solenoid—and as determined by the adjusted value of the resistance 50 conduction in tube 15 is initiated. This interval may equal the current lag in the solenoid in which case the valve will be fully opened substantially a half cycle later if the inertia constants are such that a full half wave is required to effect completion of valve actuation as explained above. The interval may be greater if a very short timing is desired so that conditioning of tube 25 may precede conditioning of tube 15 sufficiently to take up a predetermined portion of the power factor and mechanical lag thus providing and determining the normally required delay. In this manner the application of the higher pressure or the effecting of other conditions may be accomplished with extreme timed accuracy.

While the invention has been illustrated in connection with a capacitor discharge welding system employing a series tube to discharge the capacitor through the welding load it should be understood that certain parts of the invention are equally applicable in systems utilizing mechanical contactors to control the flow of welding current. Precise synchronization and consequently accurate short timing cannot then be achieved although the other advantages of the system are retained. Also the invention is applicable in welding systems utilizing half wave or alternating welding current as distinguished from direct current derived from the discharge of a capacitor, for example, although in this case proper operation would require conduction in the discharge device 15 to be synchronized with the power angle of the welding transformer. Thus, instead of conduction in tube 15 being controlled in predetermined time relation to conduction in tube 25 to provide for the timing of solenoid actuation within narrow limits, conduction in tube 15 would be synchronized with respect to the voltage wave of the source and, bearing in mind that the tube 25 should normally be rendered conductive during a predetermined portion of a voltage wave of the source to effect uniform closing of the solenoid, the adjustment of the timing period will only be in one cycle steps. However, in this case, as in the case of the capacitor discharge system, the timing will be absolutely uniform in each succeeding welding operation and this characteristic of consistency is highly desirable.

In connection with the last statement it should be understood that one of the interrelated functions of the tubes 15 and 25 and one of the features of the invention therefore is that the initiation of flow of welding current (i. e. the firing of tube 15) bears a consistent time relation to the positive A. C. voltage appearing across tube 25. In systems wherein welding current flow may be initiated non-synchronously with the reference voltage wave the advancing or delaying of the firing of the tube 15 with respect to the reference voltage wave may be utilized to effect adjustment of timing periods in less than one or one-half cycle increments. As required, a capacitor may be shunted across resistor 50 to allow an advancement of the phase position of the impulse derived from transformer 47. Other specific applications of the invention are also readily discernible.

The above specifically described embodiments of the invention should be considered as illustrative and exemplary only since various changes may be made therein without departing from the spirit or scope of the invention and since the essential features of the invention may be applied to widely varying specific uses. The invention therefore is not be limited except insofar as necessitated by the prior state of the art and the scope of the appended claims.

I claim:
1. Apparatus for effecting movement of an electromagnetically operated member a timed interval after the appearance of a reference condition comprising a source of periodic electrical energy, a circuit interconnecting said source and the electromagnetic means for operating said member including a circuit controlling device, a timing capacitor, means to vary the charge on said capacitor at a predetermined rate upon the appearance of said condition, and means operable upon the charge on said capacitor reaching a predetermined change in value to initiate conduction in said circuit during a predetermined part of a voltage wave of said source.

2. Apparatus for effecting movement of an electromagnetically operated member a timed interval after the appearance of a reference condition comprising a source of periodic electrical energy, a circuit interconnecting said source and the electromagnetic means for operating said member including an electron device having a control grid, a biasing circuit for said grid including means to vary the potential therein according to time, means for periodically varying the potential in said biasing circuit synchronously with said source whereby said device will be rendered conductive during a predetermined part of a voltage wave of said source, and means to render said first named varying means operative upon appearance of said condition.

3. Apparatus of the character described comprising in combination means to establish a condition, a device having electromagnetic operating means, means to energize said last named means from a periodic current source, and means utilizing said source to synchronize establishment of said condition with energization of said electromagnetic means including means to compensate for the power factor of said electromagnetic means.

4. Apparatus of the character described comprising in combination a source of periodic electrical energy, means establishing a condition synchronously with a wave of said source, a device having electromagnetic operating means, means to energize said last named means from said source including means to initiate said energization synchronously with said wave, and means to delay the establishment of said condition relative to said energization an interval corresponding to at least the current lag in said electromagnetic means.

CLYDE E. SMITH.

REFERENCES CITED

The following references are of record in the file of this patent:

UNITED STATES PATENTS

| Number | Name | Date |
|---|---|---|
| 2,008,413 | Dawson | July 16, 1935 |
| 2,077,600 | Watson | Apr. 20, 1937 |
| 2,105,899 | Wright | Jan. 18, 1938 |
| 2,113,664 | Simmie | Apr. 12, 1938 |
| 2,124,795 | Roby | July 26, 1938 |
| 2,134,538 | Stoddard | Oct. 25, 1938 |
| 2,146,863 | Stansbury | Feb. 14, 1939 |
| 2,227,285 | Stansbury | Dec. 31, 1940 |
| 2,283,647 | Palmer | May 19, 1942 |
| 2,315,916 | Whiteley et al. | Apr. 6, 1943 |